US011821545B1

(12) United States Patent
Horner et al.

(10) Patent No.: US 11,821,545 B1
(45) Date of Patent: Nov. 21, 2023

(54) CONVERTIBLE HEAD FOR DEIONIZATION VESSELS

(71) Applicant: ENPRESS LLC, Eastlake, OH (US)

(72) Inventors: Douglas M. Horner, Gates Mills, OH (US); Justin Fink, Strongsville, OH (US)

(73) Assignee: ENPRESS LLC, Eastlake, OH (US)

( * ) Notice: Subject to any disclaimer, the term of this patent is extended or adjusted under 35 U.S.C. 154(b) by 1320 days.

(21) Appl. No.: 16/243,243

(22) Filed: Jan. 9, 2019

Related U.S. Application Data

(60) Provisional application No. 62/750,873, filed on Oct. 26, 2018, provisional application No. 62/616,827, filed on Jan. 12, 2018.

(51) Int. Cl.
*F16L 39/02* (2006.01)
*F16L 15/00* (2006.01)
*C02F 1/42* (2023.01)

(52) U.S. Cl.
CPC .............. *F16L 15/006* (2013.01); *C02F 1/42* (2013.01); *F16L 39/02* (2013.01); *C02F 2201/004* (2013.01)

(58) Field of Classification Search
CPC ................................ F16L 15/006; F16L 39/02
See application file for complete search history.

(56) References Cited

U.S. PATENT DOCUMENTS

| 3,753,575 A | * | 8/1973 | Tracy | G02B 6/4459 |
| | | | | 285/423 |
| 3,872,004 A | * | 3/1975 | Grout | C02F 1/42 |
| | | | | 210/127 |
| 6,402,944 B1 | * | 6/2002 | Vaughan | F16J 15/102 |
| | | | | 137/625.69 |
| 2014/0097130 A1 | * | 4/2014 | Wilfong | F16K 11/0712 |
| | | | | 210/85 |
| 2019/0071326 A1 | * | 3/2019 | Liu | B01J 49/75 |

FOREIGN PATENT DOCUMENTS

| DE | 2938671 A1 * | 3/1981 | |
| EP | 0795703 A1 * | 9/1997 | |
| WO | WO-9607462 A1 * | 3/1996 | ............. B01D 29/15 |

* cited by examiner

*Primary Examiner* — Zachary T Dragicevich
*Assistant Examiner* — James A Linford
(74) *Attorney, Agent, or Firm* — Rankin, Hill & Clark LLP

(57) ABSTRACT

A head assembly system for a deionization vessel, that is convertible between a first head assembly and a second head assembly. The first head assembly includes an interchangeable head including a first threaded section; and a first insert arranged entirely within a cavity of the first threaded section. The first threaded section is threaded into a larger threaded opening of a deionization vessel. The second head assembly includes the interchangeable head; a second insert arranged partially within the cavity; and a collar threaded on the first threaded section to removably secure the second insert to the interchangeable head. The second insert includes a second threaded section arranged outside of the cavity. The second threaded section is threaded into smaller threaded opening of a deionization vessel.

10 Claims, 4 Drawing Sheets

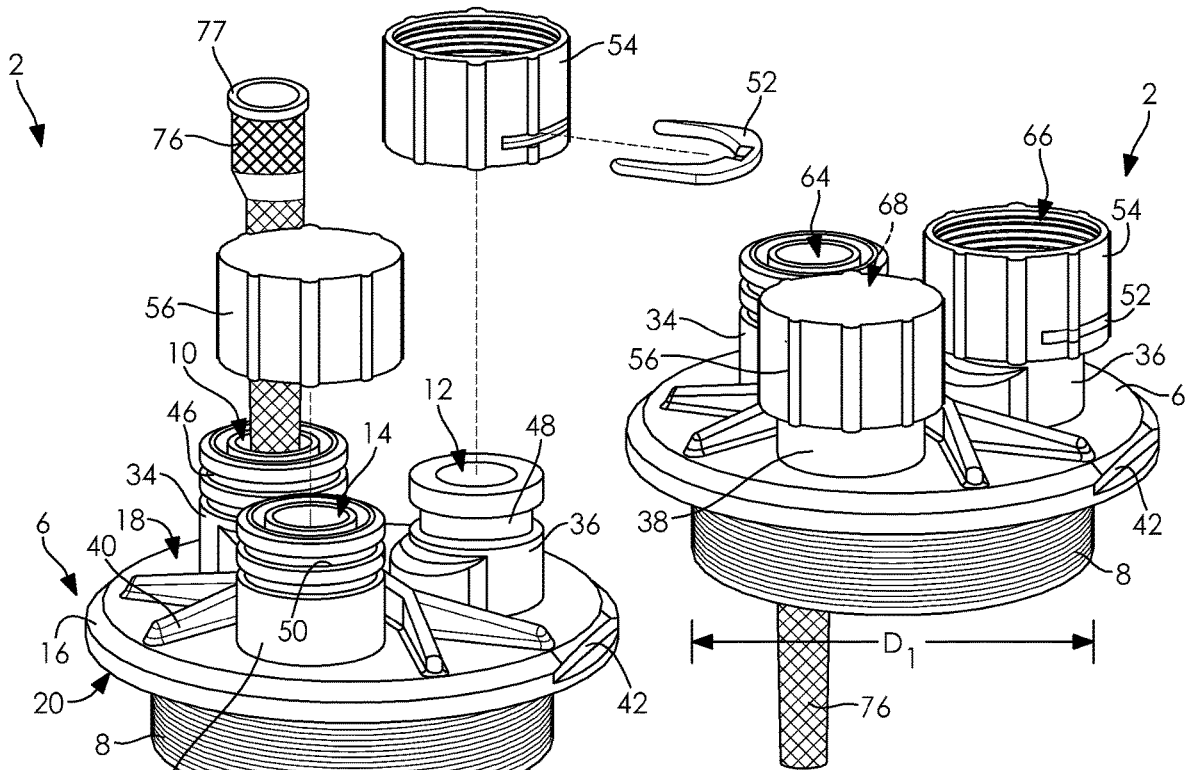
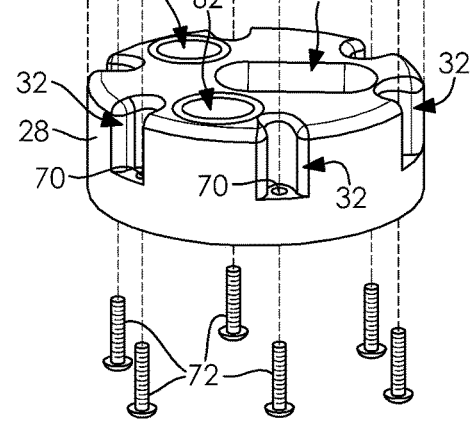
FIG. 1
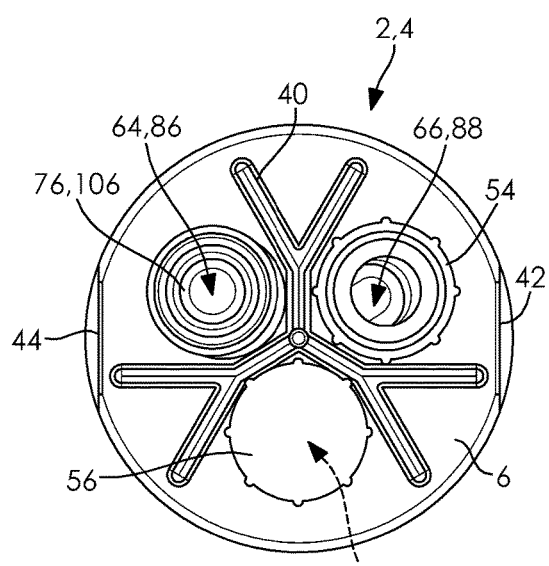
FIG. 2
FIG. 3

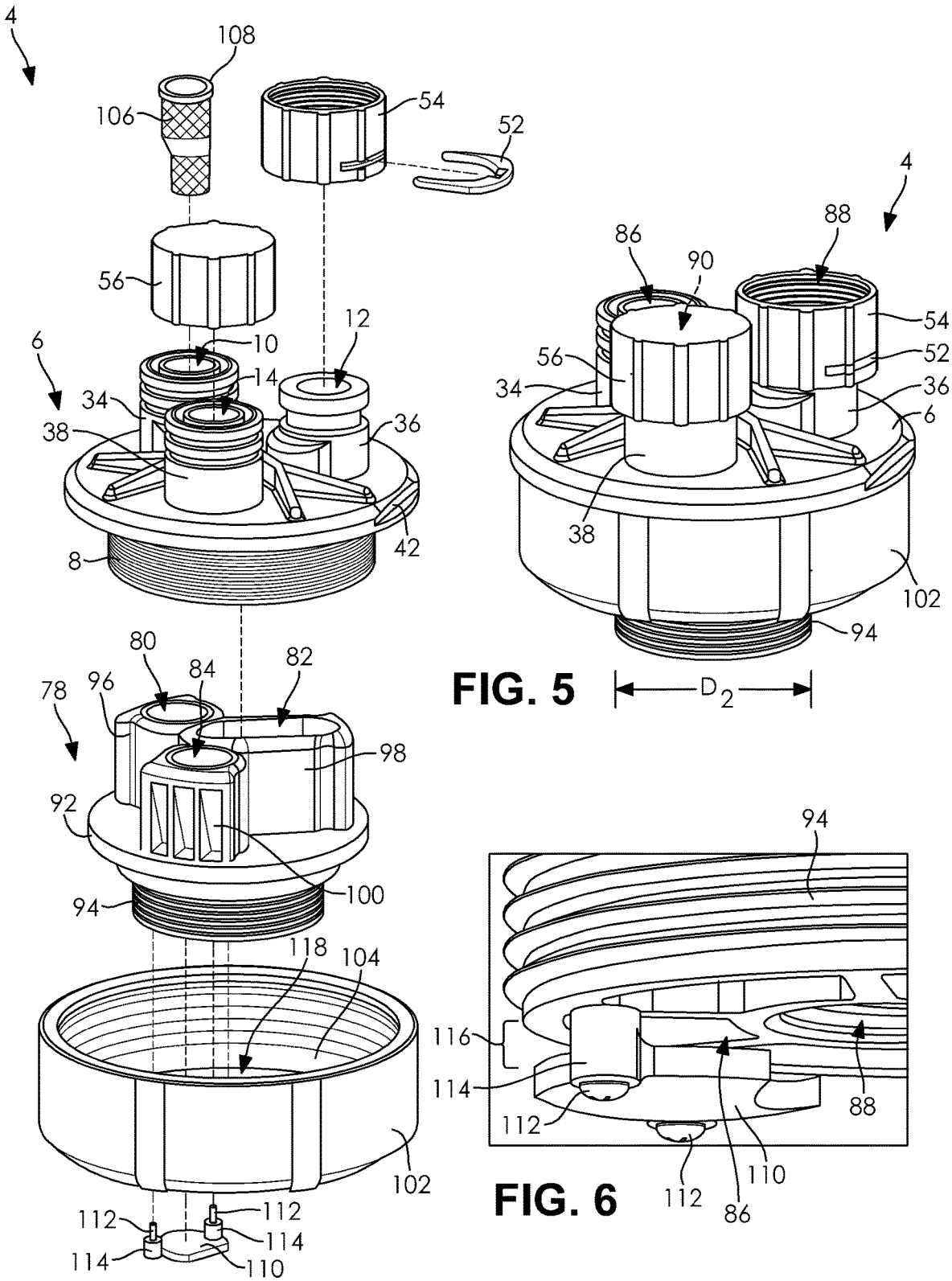

CONVERTIBLE HEAD FOR DEIONIZATION VESSELS

CROSS REFERENCE TO RELATED APPLICATIONS

This application claims the benefit of U.S. Provisional Application No. 62/616,827, filed Jan. 12, 2018, and of U.S. Provisional Application No. 62/750,873, filed Oct. 26, 2018, both of which are incorporated herein by reference.

BACKGROUND

Deionization is a process for removing ionic dissolved salts and minerals from water. Deionization is typically accomplished via ion exchange, which involves exchanging undesirable ions for more desirable ions using specially manufactured ion exchange resins. The process removes undesirable ions in exchange for ions that allow the water to be used without problems. The exchangeable ions are typically incorporated in ion exchange resins.

In industrial applications, ion exchange resins are typically contained within vessels, including a tank that contains the resin, and a head that seals an opening in the tank yet provides selective access to the interior of the tank.

These vessels incorporate different ion exchange resin types and tank sizes to accommodate different quality and flow rate requirements. Eventually, the ion exchange resins within the tanks begin to lose their functional capabilities and may be replaced. This replacement is most expediently accomplished by removing water hoses from connectors on the head of a used vessel (containing depleted ion exchange resin), and reinstalling the water hoses to connectors on the head of a replacement vessel (containing new or regenerated ion exchange resins).

The current state of the art vessel head designs are problematic due to the water hoses having to be screwed on to connectors on the head using PTFE tape as a sealant. Due to many reasons, including but not limited to installer error, these fittings inevitably begin to leak. Leaking can result in extensive damage at the industrial site and warranty claims to a manufacturer of the vessels or to the deionization service provider.

Another problem is that the old vessels containing the depleted ion exchange resin must be processed by the deionization service provider to exchange the old vessels for new ones. As noted above, the deionization service provider must process vessels in a variety of sizes, each having a different size openings, and thus different types of heads sealing the openings. However, there are generally two common head sizes: (1) a large size that has a 4.5" diameter Buttress thread opening; and (2) a small size that has a 2.5" diameter NPSM (National Pipe Straight-Mechanical) opening. Each of these head sizes has different orientations of connectors, to which the water hoses are connected. The difference in the orientations of the connectors between the various sized heads, makes processing the depleted vessels by the deionization service provider difficult and inefficient.

BRIEF DESCRIPTION

According to one aspect, a head assembly system is convertible between a first head assembly and a second head assembly. The first head assembly includes an interchangeable head including a first threaded section, and apertures extending through the interchangeable head. The first head assembly also includes a first insert removably secured to the interchangeable head and arranged entirely within a cavity defined by the first threaded section. The first insert includes a first set of holes that mate with the apertures to form a first set of channels through the first head assembly. The second head assembly includes the interchangeable head; a second insert, and a collar. The second insert is arranged partially within the cavity, and includes a second set of holes that mate with the apertures to form a second set of channels through the second head assembly, and a second threaded section arranged outside of the cavity. The collar is threaded on the first threaded section to removably secure the second insert to the interchangeable head. In the first head assembly, the first threaded section is exposed to thread the first threaded section into an associated first threaded opening. In the second head assembly, the first threaded section is covered by the collar, and the second threaded section is exposed to thread the second threaded section to into an associated second threaded opening.

According to another aspect, a method of assembling a deionization vessel includes selecting a deionization tank having a threaded opening to an interior of the tank. The method includes determining a size of the threaded opening, and providing a head assembly system that is convertible between a first head assembly and a second head assembly. The first head assembly includes an interchangeable head and a first insert. The interchangeable head includes a first threaded section and apertures extending through the interchangeable head. The first insert is removably secured to the interchangeable head and arranged entirely within a cavity defined by the first threaded section. The first insert includes a first set of holes that mate with the apertures to form a first set of channels through the first head assembly. The second head assembly includes the interchangeable head, a second insert, and a collar. The second insert is arranged partially within the cavity, and includes a second set of holes that mate with the apertures to form as second set of channels through the second head assembly. The second insert also includes a second threaded section arranged outside of the cavity. The collar is threaded on the first threaded section to removably secure the second insert to the interchangeable head. The first threaded section has a first diameter that is larger than a second diameter of the second threaded section. In the second head assembly, the first threaded section is covered by the collar. If the first threaded section can be threaded into the threaded opening, the method includes attaching the first head assembly to the tank by threading the first threaded section into the threaded opening. If the second threaded section can be threaded into the threaded opening, then the method includes attaching the second head assembly to the tank by threading the second threaded section into the threaded opening.

BRIEF DESCRIPTION OF THE DRAWINGS

FIG. 1 is an exploded perspective view of a first head assembly according to the present subject matter.

FIG. 2 is a perspective view of the first head assembly of FIG. 1 in a fully assembled state.

FIG. 3 is a plan view of the first head assembly of FIG. 1 and of a second head assembly according to the present subject matter.

FIG. 4 is an exploded perspective view of a second head assembly according to the present subject matter.

FIG. 5 is a perspective view of the second head assembly of FIG. 4 in a fully assembled state.

FIG. 6 is a detailed perspective view of a bottom portion of the second head assembly of FIG. 5.

Figure 7:
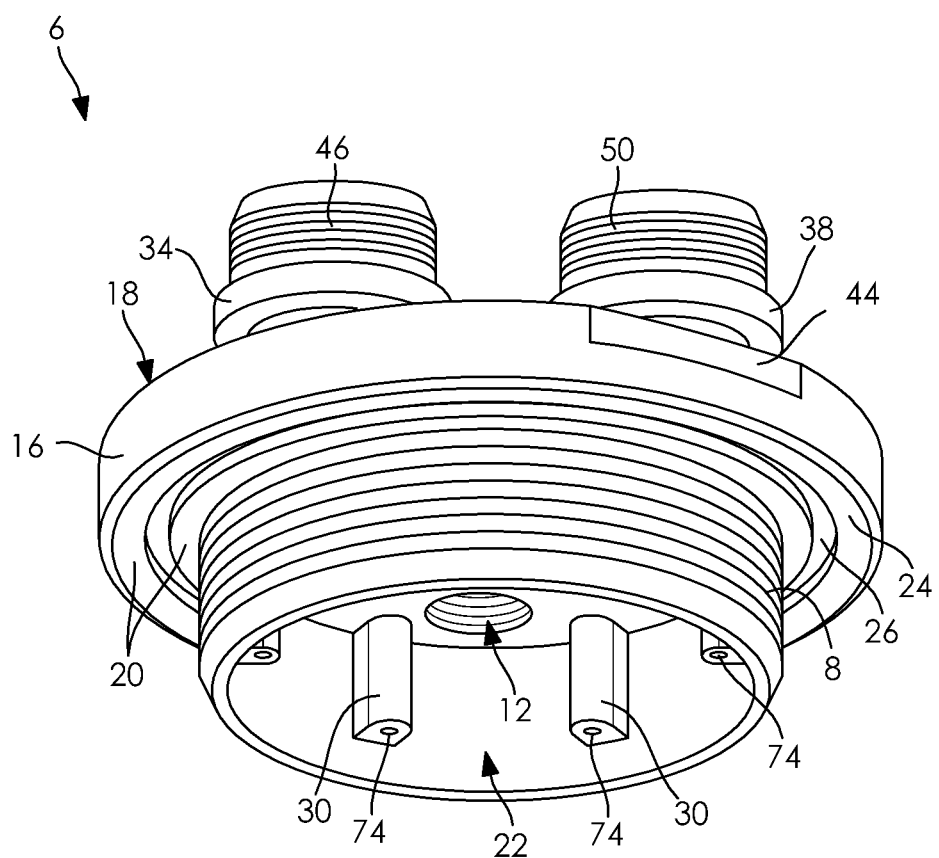
FIG. 7 is a perspective view of a bottom of an interchangeable head according to the present subject matter.

The foregoing and other features of the invention are hereinafter more fully described below, the following description setting forth in detail certain illustrative embodiments of the invention, these being indicative, however, of but a few of the various ways in which the principles of the present invention may be employed.

DETAILED DESCRIPTION

According to the present subject matter provides a deionization vessel including a deionization tank and a head assembly (e.g. a first head assembly or a second head assembly) attached thereto. The present invention provides a convertible head assembly system that is convertible between a first configuration (i.e. a first head assembly) and a second configuration (i.e. a second head assembly) in order to be threaded into different size openings in various deionization tanks. The first head assembly and the second head assembly present the same configuration of connectors, so as to simplify the connection of water hoses thereto no matter which head assembly between the first and the second is arranged on a deionization tank.

As used herein, the term "convertible" means that the convertible head assembly system according to the invention can be used to accommodate (i.e. threadingly mate with) both larger (e.g. 4.5" diameter) and smaller (e.g. 2.5" diameter) size associated threaded openings in deionization tanks. The convertible head assembly system includes two different threaded sections to fit different size associated threaded openings in the tanks, and thus can replace heads of existing deionization vessels. The associated threaded openings in the tanks may be female threads, e.g. a 4.5 inch female thread, a 2.5 inch female thread, or other sized female threads. This standardization of head assemblies presenting the same configuration of connectors, allows deionization service providers to automate resin removal from vessels containing depleted ion exchange resins, and to refill the vessels with fresh (i.e., new and/or regenerated) ion exchange resin using robotic technology for an automated dump and fill cell. Because the head assemblies present the same configuration of connectors, a robotic machine can more easily connect to the connectors on the head assemblies without having to reconfigure the robotic machine.

The present design addresses the problem of having to reconfigure a robotic machine, by utilizing the same interchangeable head for each of the first and second head assemblies. Each vessel including either the first or second head assembly, and regardless of size of the tank, can thus be presented to robotic automated dump and fill cell in an identical orientation, which greatly simplifies automation of the cell. Another feature is that that the head assembly system can be converted to connect to either size openings (e.g. 2.5" or 4.5" diameter) as required, which accommodates an end-user's tank population as it changes over time.

Referring to the figures, the head assembly system includes, and is convertible between, a first head assembly 2 and a second head assembly 4.

The first head assembly 2 includes an interchangeable head 6 including a first threaded section 8, and apertures 10, 12, 14 extending through the interchangeable head 6. As shown, the interchangeable head 6 includes a plate portion 16 including a top surface 18 and a bottom surface 20 opposite from the top surface 18. As used herein, "bottom" refers to a feature that is down in the figures, and is directed towards a deionization tank when the head assemblies are threaded onto a threaded opening in the tank; while "top" refers to a feature that is up in the figures, and is directed away from the deionization tank.

The first threaded section 8 is a male thread that extends downward from the bottom 20 of the plate portion 16, and is exposed (FIG. 2) when the first head assembly 2 is fully assembled. The first threaded section 8 is hollow and thereby defines a cavity 22 at the bottom of the interchangeable head 6. The first threaded section 8 may be sized to threadingly mate with a larger (e.g. 4.5") associated first threaded opening in a deionization tank. The first threaded section 8 may therefore have a first diameter $D_1$ that is designated as a 4.5" diameter. However, this 4.5" designation is for labeling purposes and does not necessarily denote the actual size of the first threaded section 8 or other components of the first head assembly 2. The first diameter $D_1$ may be smaller than a diameter of the plate portion 16, thereby defining an annular lip 24 on the plate portion 16 that is radially outside the first threaded section 8. The lip 24 may include an annular trench 26 that may accommodate an O-ring, or other mechanical seals, for sealing against the deionization tank.

The cavity 22 may be sized to accept a first insert 28 therein, and the interchangeable head 6 may include protrusions 30 in the cavity 22 that mate with grooves 32 in the first insert 28 that cause the first insert 28 to be aligned (i.e. indexed) in the cavity 22. The interchangeable head 6 may include any number of protrusions 30 as desired, for example six protrusions or more or less. A corresponding number of grooves 32 may be included on the first insert 28. As shown in FIG. 1, the first insert includes six grooves 32.

The apertures 10, 12, 14 may be partially defined by respective hollow posts 34, 36, 38 extending upward from the top surface 18. The posts 34, 36, 38 act as connectors for connecting the head assembly system to various devices for water delivery and extraction, and resin exchange. The posts 34, 36, 38 (i.e. the connectors) and the other portions of the interchangeable head 6 are integrally molded as a single piece, and thus the connections with these various devices may not require the use of PTFE tape as a sealant. Instead, O-rings may be utilized for this purpose as explained in more detail herein.

Since the interchangeable head 6 is used in the first head assembly 2 and the second head assembly 4, the head assembly system presents a uniform and consistent configuration of connectors for water delivery and extraction (one for incoming water to be treated and one for outflowing water that has been treated), and resin exchange from the interior of the deionization vessel. In other words, to the perspective of a robot, the top of the first head assembly 2 is identical in all respects to the top of the second head assembly 4, both of which are shown in FIG. 3.

The plate portion 16 may include a network 40 of ribs on the top surface 18 between the posts 34, 36, 38. The plate portion 16 may also include flat edge portions 42, 44 that can be engaged by a tool (e.g. a wrench) for turning the interchangeable head 6 relative to the deionization tank. The apertures 10, 12, 14 extend from the top of the posts 34, 36, 38 downward through the interchangeable head 6 to the bottom surface 20 of the plate portion 16 and terminate inside the cavity 22.

A first post 34 may partially define a first aperture 10, a second post 36 may partially define a second aperture 12, and a third post 38 may partially define a third aperture 14.

The first post 34 may include a male thread 46 at its top. The male thread 46 may be used to threadingly connect to a water hose during a deionization process. The second post 36 may include an annular groove 48 near its top. The annular groove 48 may accept a C-clip 52 inserted through a female-threaded ring 54, which may be used to connect to a water hose during a deionization process, which may be used for example, to extract treated water from the deionization vessel. The third post 38 may include a male thread 50 at its top. The male thread 50 may be mated with a female-threaded cap 56 that closes off the third aperture 14 during a deionization process, but which may be removed when replacing ion exchange resin from the deionization vessel through the third aperture 14. The cap 56 may be removed by a robot when the depleted ion exchange resin in the vessel is to be removed and replaced with fresh ion exchange resin.

O-rings, or other mechanical seals, may be arranged between the posts 34, 36, 38 and the respective water hose, ring 54, or cap 56 to form a seal at these junctions. A groove may be provided at the top of the posts surrounding the apertures for receiving an O-ring, which ensures that the connection with the hoses does not leak.

Figure 8:
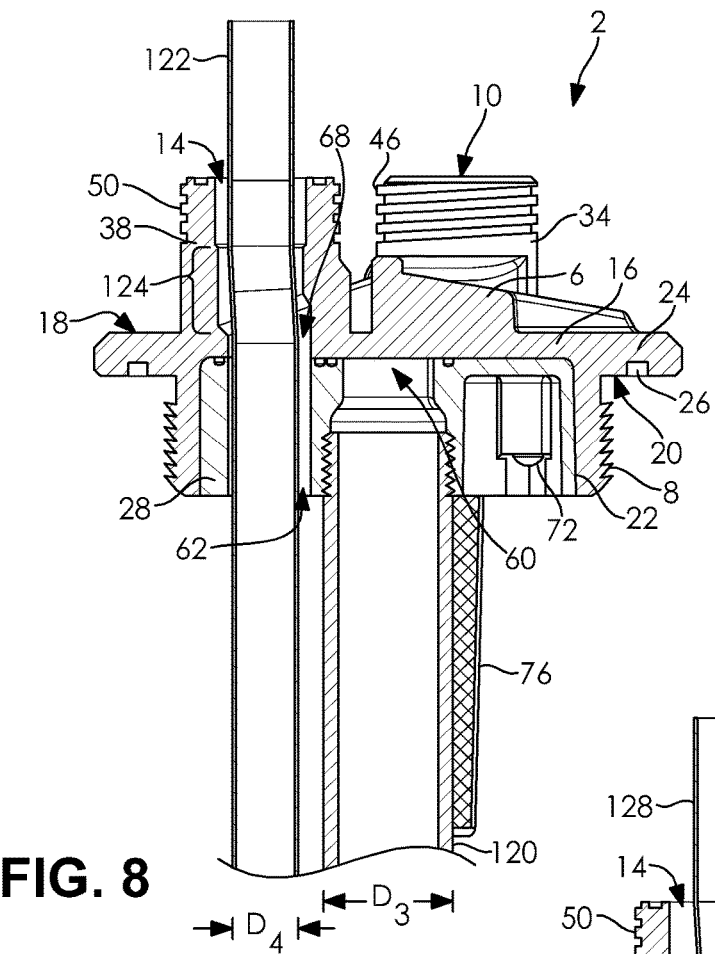
FIG. 8 is a sectional view of the first head assembly of FIG. 2.

The first head assembly 2 includes a first insert 28 that may be received inside the cavity 22. The first insert 28 may be arranged entirely within the cavity 22 such that the first insert does not extend down past the bottom edges of the first threaded section 8, which is best seen in FIG. 8. The first insert 28 includes a first set of holes 58, 60, 62 extending through the first insert 28. The first insert 28 may be aligned (i.e. indexed) inside the cavity 22 of the interchangeable head 6 such that a first hole 58 aligns with the first aperture 10 of the interchangeable head 6 to form a first channel 64 extending through the first head assembly 2; a second hole 60 aligns with the second aperture 12 to form a second channel 66 extending through the first head assembly 2; and a third hole 62 aligns with the third aperture 14 to form a third channel 68 extending through the first head assembly 2. As shown, the second hole 60 is elongated, and the first and third holes 58, 62 are circular; however, this configuration is not required. O-rings, or other mechanical seals, may be arranged between the holes 58, 60, 62 and the respective apertures 10, 12, 14 to seal the channels 64, 66, 68 at the junctions between the holes 58, 60, 62 and apertures 10, 12, 14. When the first head assembly 2 is threaded onto the threaded opening of the deionization tank, the first channel 64, the second channel 66, and the third channel 68 provide access to the interior of the deionization tank.

The grooves 32 of the first insert 28 and the protrusions 30 of the interchangeable head 6 may be arranged such as to only allow the first insert 28 to be inserted into the cavity 22 in only one alignment where the first hole 58 aligns with the first aperture 10, the second hole 60 aligns with the second aperture 12, and the third hole 62 aligns with the third aperture 14; and may prevent the first insert 28 from being inserted inside the cavity 22 in any other arrangement. This may be accomplished for example, by the circumferential spacing between the grooves 32 and the circumferential spacing between the protrusions 30, or by the relative sizes of the mating grooves 32 and protrusions 30.

The grooves 32 may each terminate near a bottom of the first insert 28 at shelves, through which fastener through holes 70 extend. Fasteners 72 may be inserted through the fastener through holes 70 and threaded into fasteners holes 74 in the protrusions 30 for removably securing the first insert 28 inside the cavity 22. Other mechanisms of securing the first insert 28 inside the cavity 22 may be used, including compression, clips, adhesive, etc.

The first head assembly 2 may include a first distributor screen 76 that may be arranged in the first channel 64. The first distributor screen 76 may be shaped like a glass, with closed sides and bottom and an open top. The first distributor screen 76 may include a flange 77 near the open top that prevents the first distributor screen 76 from passing all the way through the first channel 64 when inserted into the top of the first channel 64, and may allow a bottom end of the first distributor screen 76 to extend out of the bottom of the first channel 64 and downward past the first threaded section 8 of the interchangeable head 6 as shown in FIG. 2. The first distributor screen 76 may have a screen mesh size configured to catch debris that may be present in the incoming water being delivered through the first channel 64 into the interior of the deionization tank, and may operate as a water distributor to evenly flow the incoming water over the bed of ion exchange resin in the deionization tank. The first distributor screen 76 may be removable from the first channel 64 so that any debris caught therein may be disposed of.

The second head assembly 4 may include a second insert 78 that may be received inside the cavity 22 of the interchangeable head 6. The second insert 78 includes a second set of holes 80, 82, 84 extending through the second insert 78. The second insert 78 may be aligned (i.e. indexed) inside the cavity 22 such that a fourth hole 80 aligns with the first aperture 10 of the interchangeable head 6 to form a fourth channel 86 extending through the second head assembly 4; a fifth hole 82 aligns with the second aperture 12 to form a fifth channel 88 extending through the second head assembly 4; and a sixth hole 84 aligns with the third aperture 14 to form a sixth channel 90 extending through the second head assembly 4. As shown, the fifth hole 82 is elongated, and the fourth and sixth holes 80, 84 are circular; however, this configuration is not required.

O-rings, or other mechanical seals, may be arranged between the holes 80, 82, 84 and the respective apertures 10, 12, 14 to seal the channels 86, 88, 90 at the junctions between the holes 80, 82, 84 and apertures 10, 12, 14. When the second head assembly 4 is threaded into the threaded opening of the deionization tank, the channels 86, 88, 90 provide access to the interior of the deionization tank.

Figure 9:
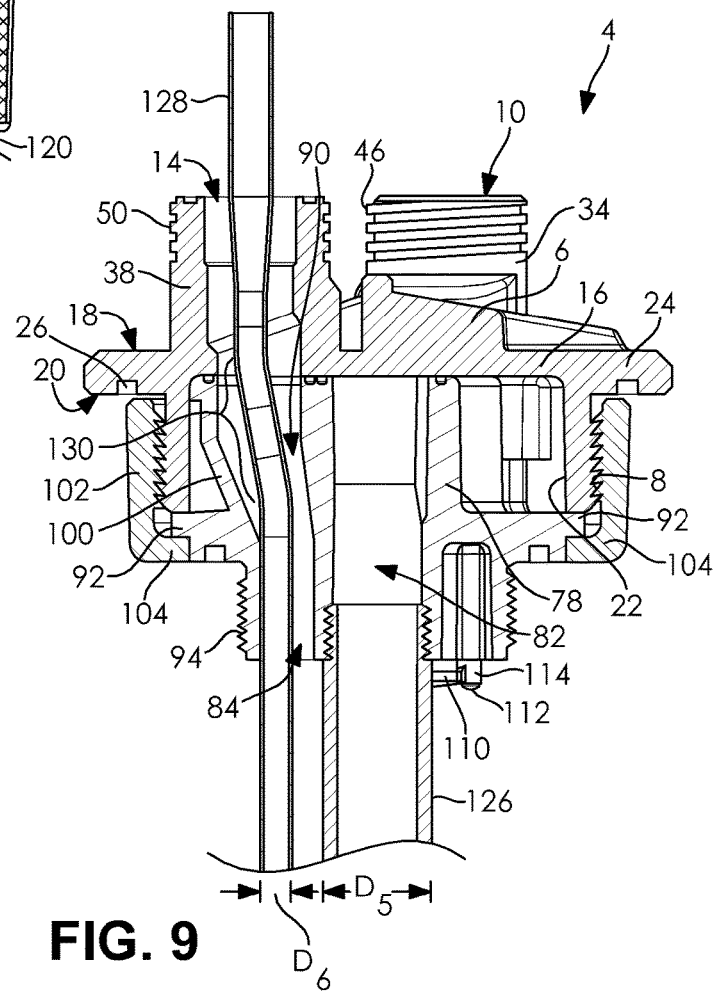
FIG. 9 is a sectional view of the second head assembly of FIG. 5.

The second insert 78 may include a disk portion 92, a second threaded section 94 protruding down from a bottom of the disk portion 92, and hollow columns 96, 98, 100 protruding up from a top of the disk portion 92. The holes 80, 82, 84 may be partially defined by the respective hollow columns 96, 98, 100 as shown. As seen if FIG. 5, only a portion of the second insert 78 (i.e. the columns 96, 98, 100 and the disk portion 92) may be arranged in the cavity 22, while the second threaded section 94 may not arranged in the cavity 22 and protrudes downward past a bottom edge of the first threaded section 8, which is best seen in FIG. 9.

The hollow columns 96, 98, 100 may be arranged on the disk portion 92 so as to mate with the protrusions 30 on the interchangeable head 6 in order to align the second insert 78 with the interchangeable head 6. Such mating between the columns 96, 98, 100 and the protrusions 30 may be accomplished arranging each of the columns 96, 98, 100 between two of the protrusions 30.

The columns 96, 98, 100 of the second insert 78 and the protrusions 30 of the interchangeable head 6 may be arranged such as to only allow the second insert 78 to be inserted into the cavity 22 in only one alignment where the fourth hole 80 aligns with the first aperture 10, the fifth hole 82 aligns with the second aperture 12, and the sixth hole 84 aligns with the third aperture 14; and may prevent the second insert 78 from being inserted inside the cavity 22 in any other arrangement.

The second head assembly 4 may include a female-threaded collar 102 that can be threaded onto the first threaded section 8 after the second insert 78 is arranged in the cavity 22 so as to removably secure the second insert 78 in the cavity 22. The collar 102 may include central opening 118 through which the second threaded section 94 passes, and a shoulder 104 around the central opening 118 at the bottom of the collar 102. When the collar 102 is threaded onto the first threaded section 8, the shoulder 104 engages the disk portion 92 and thereby holds the second insert 78 in the cavity 22, which is best depicted in FIG. 9.

When the second head assembly 4 is fully assembled (FIG. 5), the second threaded section 94 may be exposed in order to be threaded into an opening of a deionization tank. The second threaded section 94 may be sized to threadingly mate with a smaller (e.g. 2.5") associated second threaded opening in a deionization tank than the first threaded section 8. The second threaded section 94 may therefore have a second diameter $D_2$ that is designated as a 2.5" thread. However, this 2.5" designation is for labeling purposes and does not necessarily denote the actual size of the second threaded section 94 or other components of the second head assembly 4. O-rings, or other mechanical seals, may be used to seal the collar 102 to the second insert 78, to the interchangeable head 6, and/or to the top of the deionization tank.

The first head assembly 2 may include a second distributor screen 106 that may be arranged in the fourth channel 86. The second distributor screen 106 may be shaped like a glass, with closed sides and bottom and an open top. The second distributor screen 106 may include a flange 108 near the open top that prevents the second distributor screen 106 from passing all the way through the fourth channel 86 when inserted into the top of the fourth channel 86. A bottom end of the second distributor screen 106 may not extend out past the bottom of the fourth channel 86 or downward past the first threaded section 8 of the interchangeable head 6. The second distributor screen 106 may have a screen mesh size configured to catch debris that may be present in the incoming water being delivered through the fourth channel 86 into the interior of the deionization tank. The second distributor screen 106 may be removable from the fourth channel 86 so that any debris caught therein may be disposed of.

Since the bottom of the second distributor screen 106 may not extend past the bottom of the first threaded section, the second distributor screen 106 may not satisfactorily operate as a water distributor to evenly flow the incoming water over the bed of ion exchange resin in the deionization tank. Because of this, the second head assembly may further include a deflector plate 110 arranged under, and spaced from, the fourth channel 86 as shown in FIG. 6. The deflector plate 110 may be removably connected to the bottom of the second insert 78 with threaded screws 112 or other fasteners. The deflector plate 110 may be used to disperse water that is being delivered through the fourth channel 86 and into the interior of the deionization tank. The deflector plate 110 may deflect the incoming water to more evenly disperse the incoming water over the ion exchange resin in the tank to inhibit channeling and early break through. This may provide longer run times between resin regeneration/replacement, which allows for more gallons of water being processed between resin regeneration/replacement. If the deflector plate 110 were not included, the incoming water may be delivered to the resin bed in a stream, rather than a dispersed spray, thus resulting in the water following a path of least resistance and forming a channel in and breaking through the resin bed to the bottom of the deionization vessel and not utilizing all of the resin in the deionization vessel; thus requiring more frequent resin regeneration/replacement.

As shown, the deflector plate 110 includes spacers 114, through which the screws 112 are inserted and which provide a gap 116 between the bottom surface of the second insert 78 and the deflector plate 110. This arrangement allows the deflector plate 110 to not completely cover the fourth channel 86 at the bottom of the second insert 78, allows water to flow through the fourth channel 86, and allows for water to be deflected by the deflector plate 110 and into the deionization vessel.

When attached to a deionization tank, the first head assembly 2 may be attached to a first dip tube 120, which may be threaded on to the bottom of the first insert 28 as depicted in FIG. 8, and arranged on center of the first head assembly 2 and the deionization vessel. Water may be delivered through the first channel 64 and first distributor screen 76 and spread across the top of the resin bed in the deionization vessel. The water may travel down through the resin bed to a bottom of the deionization vessel, thereby being deionized. The deionized water may then be transported up through the first dip tube 120 and out of the deionization vessel. When the resin needs to be extracted from the deionization vessel, e.g. in an automated process, the cap 56 may be removed from the third post 38, and a first extraction tube 122 may be inserted through the third channel 68 and extended to a bottom of the deionization vessel. The used resin may then be extracted through the first extraction tube 122 so that new resin may be inserted in the deionization vessel. As depicted in FIG. 8, the third channel 68 may not be a straight as it extends through the interchangeable head 6 and the first insert 28, and therefore the first extraction tube 122 may have a first bent portion 124 so as to properly fit through the third channel 68. The first bent portion 124 may allow the first extraction tube 122 to extend all the way down to the bottom of the deionization vessel so that it is parallel to the first dip tube 120 as depicted, and so that the first dip tube 120 and the first extraction tube 122 do not interfere with each other. Without including the first bent portion 124, the first extraction tube 122 may bang into the first dip tube 120 and may not be able to be extended all the way to the bottom of the deionization vessel, thus preventing the complete extraction of used resin. The first bent portion 124 may allow the first extraction tube 122 to be extended all the way to the bottom of the deionization vessel. The first extraction tube 122 may have a circular cross section.

When attached to a deionization tank, the second head assembly 4 may be attached to a second dip tube 126, which may be threaded on to the bottom of the second insert 78 as depicted in FIG. 9, and arranged on center of the second head assembly 4 and the deionization vessel. Water may be delivered through the fourth channel 86 and second distributor screen 106, deflected by the deflector plate 110, and spread out across the top of the resin bed in the deionization vessel. The water may travel down through the resin bed to a bottom of the deionization vessel, thereby being deionized. The deionized water may then be transported up through the second dip tube 126 and out of the deionization vessel. When the resin needs to be extracted from the deionization vessel, e.g. in an automated process, the cap 56 may be removed from the third post 38, and a second extraction tube 128 may be inserted through the sixth channel 90 and extended to a bottom of the deionization vessel. The used resin may then be extracted through the second extraction tube 128 so that new resin may be inserted in the deionization vessel. As depicted in FIG. 9, the sixth channel 90 may not be a straight as it extends through the interchangeable head 6 and the second insert 78, and therefore the second extraction tube 128 may have a second bent portion 130 so as to properly fit through the sixth channel 90. The second bent portion 130 may allow the second extraction tube 128 to extend all the way down to the bottom of the deionization vessel so that it is parallel to the second dip tube 126 and so that the second dip tube 126 and the second extraction tube 128 do not interfere with each other. Without including the second bent portion 130, the second extraction tube 128 may bang into the second dip tube 126 and may not be able to be extended all the way to the bottom of the deionization vessel, thus preventing the complete extraction of used resin. The second bent portion 130 may allow the second extraction tube 128 to be extended all the way to the bottom of the deionization vessel. The second extraction tube 128 may have a circular cross section at its top, and an ovoidal cross section starting just above the second bent portion 130 and going down to the bottom of the second extraction tube 128. This oval-shaped cross section may allow the second extraction tube 128 to properly fit through the sixth channel 90 without having to reduce the cross-sectional area of the second extraction tube 128.

The diameter $D_3$ of the first dip tube 120 may be larger than the diameter $D_5$ of the second dip tube 126, but this is not required. The diameter $D_4$ of the first extraction tube 122 may be larger than the diameter $D_6$ of the second extraction tube 128, but this is not required.

A method of assembling a deionization vessel includes selecting a deionization tank having a threaded opening to an interior of the tank. A size of the threaded opening in the tank is determined. A head assembly system is provided, which is convertible between the first head assembly 2 and the second head assembly 4. The first head assembly 2 is as described herein, and includes the interchangeable head 6, which includes a first threaded section 8 and apertures 10, 12, 14 extending through the interchangeable head 6. The first head assembly 2 includes the first insert 28 removably secured to the interchangeable head 6 and arranged entirely within the cavity 22 defined by the first threaded section 8. The first insert 28 includes the first set of holes 58, 60, 62 that mate with the apertures 10, 12, 14 to form a first set of channels 64, 66, 68 through the first head assembly 2. The second head assembly 4 includes the interchangeable head 6, and the second insert 78 arranged partially within the cavity 22 of the interchangeable head 6. The second insert 78 includes the second set of holes 80, 82, 84 that mate with the apertures 10, 12, 14 to form the second set of channels 86, 88, 90 through the second head assembly 4. The second insert 78 also includes the second threaded section 94, which is arranged outside of the cavity 22. The collar 102 is threaded on the first threaded section 8 to removably secure the second insert 78 to the interchangeable head 6. The first threaded section 8 has the first diameter $D_1$ that is larger than the second diameter $D_2$ of the second threaded section 94. In the second head assembly 4, the first threaded section 8 is covered by the collar 102.

The method includes, if the first threaded section 8 can be threaded into the threaded opening of the tank, then the method includes attaching the first head assembly 2 to the tank by threading the first threaded section 8 into the threaded opening of the tank. If the second threaded section 94 can be threaded into the threaded opening of the tank, then the method includes attaching the second head assembly 4 to the tank by threading the second threaded section 94 into the threaded opening of the tank.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A head assembly system of a deionization vessel comprising an interchangeable head including a first threaded section defining a cavity, a first insert, a second insert including a second threaded section, and a collar, the head assembly system being convertible between a first configuration forming a first head assembly and a second configuration forming a second head assembly, wherein:
   in the first configuration, the first head assembly comprises:
      the interchangeable head; and
      the first insert removably secured to the interchangeable head and arranged entirely within the cavity defined by the first threaded section, wherein a first set of channels extend through the first head assembly;
   in the second configuration, the second head assembly comprises:
      the interchangeable head;
      the second insert arranged partially within the cavity, wherein a second set of channels extends through the second head assembly, and the second threaded section is arranged outside of the cavity; and
      the collar threaded on the first threaded section to removably secure the second insert to the interchangeable head;
   in the first configuration, the first threaded section is exposed to thread the first threaded section into an associated first threaded opening;
   in the second configuration, the first threaded section is covered by the collar, and the second threaded section is exposed to thread the second threaded section into an associated second threaded opening.

2. The head assembly system according to claim 1, wherein the first threaded section has a larger diameter than the second threaded section.

3. The head assembly system according to claim 1, wherein:
   the first threaded section has a first diameter that threads into a 4.5 inch female thread; and
   the second threaded section has a second diameter that threads into a 2.5 inch female thread.

4. The head assembly system according to claim 1, further comprising fasteners, wherein in the first configuration, the first insert is secured to the interchangeable head by the fasteners.

5. The head assembly system according to claim 1, wherein:
   apertures extend through the interchangeable head;
   a first set of holes extend through the first insert;
   a second set of holes extend through the second insert;
   in the first configuration, the first insert is aligned within the cavity to thereby mate the first set of holes with the apertures to form the first set of channels; and in the second configuration, the second insert is aligned within the cavity to thereby mate the second set of holes with the apertures to form the second set of channels.

6. The head assembly system according to claim 5, wherein each of the apertures is partially defined by a hollow post arranged on a top of the interchangeable head.

7. The head assembly system according to claim 5, wherein:
the head assembly system further includes mechanical seals;
in the first configuration, one of the mechanical seals is arranged between each of the apertures and each of the first set of holes; and
in the second configuration, one of the mechanical seals is arranged between each of the apertures and each of the second set of holes.

8. The head assembly system according to claim 1, wherein:
the head assembly system further includes a first distributor screen, and second distributor screen;
in the first configuration, the first head assembly includes the first distributor screen arranged in one channel of the first set of channels, and a bottom end of the first distributor screen extends out of a bottom of the one channel of the first set of channels; and
in the second configuration, the second head assembly includes the second distributor screen arranged in one channel of the second set of channels, and a bottom end of the second distributor screen does not extend out of a bottom of the one channel of the second set of channels.

9. The head assembly system according to claim 8, wherein:
the head assembly system further includes a first extraction tube having a first bent section, and a second extraction tube having a second bent section;
in the first configuration, the first head assembly includes the first extraction tube inserted through another channel of the first set of channels for extracting used resin from the deionization vessel; and
in the second configuration, the second head assembly includes the second extraction tube inserted through another channel of the second set of channels for extracting used resin from the deionization vessel.

10. The head assembly system according to claim 8, wherein:
the head assembly system further includes a deflector plate; and
in the second configuration, the second head assembly includes the deflector plate arranged under, and spaced from, the one channel of the second set of channels.

* * * * *